D. A. CLARK AND C. E. LOWE.
MANDREL FOR TIRE TUBES.
APPLICATION FILED JULY 31, 1919.
1,330,785.
Patented Feb. 17, 1920.
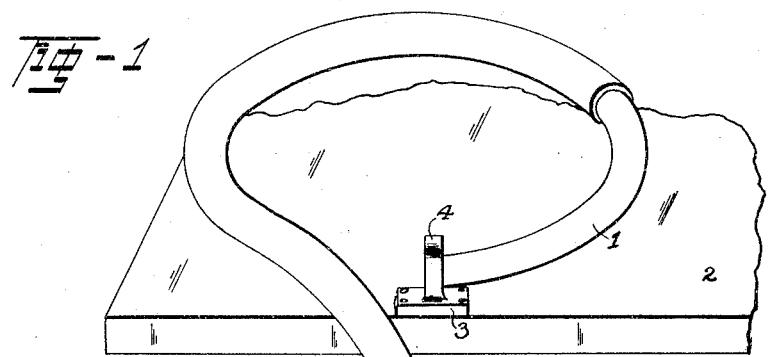
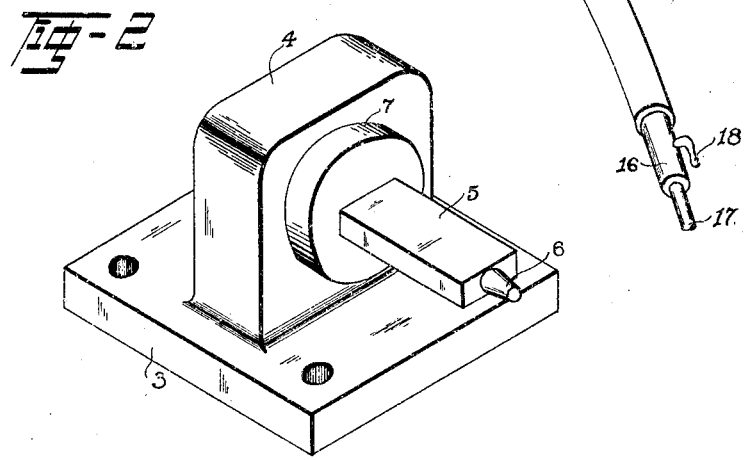
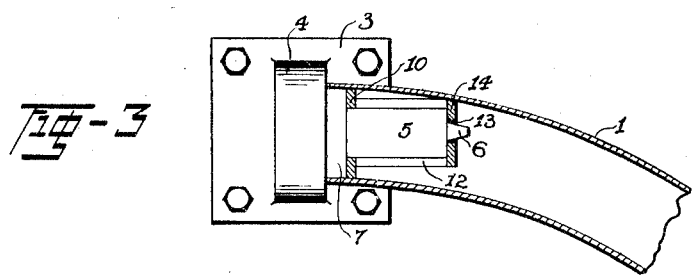
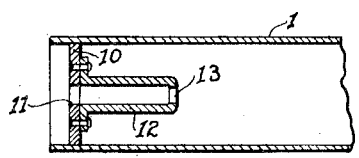
Inventors
Don A Clark and
Clyde E. Lowe
By Hull Smith Brock & West
Attys

UNITED STATES PATENT OFFICE.

DON A. CLARK AND CLYDE E. LOWE, OF CLEVELAND, OHIO, ASSIGNORS, BY MESNE ASSIGNMENTS, TO THE REPUBLIC TOOL AND MANUFACTURING COMPANY, OF CLEVELAND, OHIO, A CORPORATION OF DELAWARE.

MANDREL FOR TIRE-TUBES.

1,330,785.     Specification of Letters Patent.     Patented Feb. 17, 1920.

Application filed July 31, 1919. Serial No. 314,550.

*To all whom it may concern:*

Be it known that we, DON A. CLARK and CLYDE E. LOWE, citizens of the United States, residing at Cleveland, in the County of Cuyahoga and State or Ohio, have invented a certain new and useful Improvement in Mandrels for Tire-Tubes, of which the following is a full, clear, and exact description reference being had to the accompanying drawings.

This invention relates to a mandrel for forming and curing the inner tubes of pneumatic tires, together with a means for supporting the same during the application of the tube thereto and its removel therefrom. In our prior application filed March 7, 1919, Serial No. 281.283. Patent No. 1,316,276, we described and claimed a discontinuous, torus-shaped, sheet-metal mandrel, and in the application of Clyde E. Lowe, filed March 7, 1919, Serial No. 281,176 there was described and claimed a process of curing a pneumatic tire-tube on such a mandrel. The object of the present invention is the provision of new and improved means for supporting such a mandrel during the application of the uncured tube thereto and its removal therefrom; the provision of a mandrel having local reinforcement whereby distortion of the same shall be prevented during the application of the raw tube thereto; the provision of means for preventing the leakage of air through such mandrel during the application of the tube; while further objects and advantages of the invention will become apparent as the description proceeds.

In the drawings accompanying and forming a part of this application Figure 1 illustrates our improved mandrel supported in receiving position and in the act of having an uncured tube applied thereto; Fig. 2 is a perspective view of the mandrel bracket; Fig. 3 is a top plan view of the bracket with a mandrel applied thereto, the latter being shown in section; and Fig. 4 is an axial sectional view of the mandrel taken at right angles to the section of Fig. 3.

Describing the parts by reference characters, our improved mandrel is shown at 1 and is made of sheet metal sections as stated, but the particular arrangement of the sections or the mode of securing them together is not important to the present invention. For securing this bracket in place upon a suitable support, such as the table or workbench 2, we have devised a bracket consisting essentially of a base 3, an upright 4 carried thereby, and a horizontal prong 5 projecting from said upright. This prong is flattened and substantially rectangular in shape but is formed at its extreme end with a tapered projection 6, while its base is surrounded by a pad 7 of soft rubber or similar packing which lies against the face of the upright.

Secured a short distance inside the end of the mandrel 1 is a rigid plate 10 having a centrally located slot 11 of a size to receive the prong 5 as shown in Fig. 3, while to the inner face of said plate is a U-shaped stirrup 12 whose cavity registers with the slot 7 in such wise as to receive the prong snugly, while the end of the stirrup is formed with an aperture 13 adapted to receive the projection 6. The plate 10 is displaced inwardly from the end of the mandrel a sufficient distance to constitute a seat for the pad 7, and the length of the stirrup 12 and hence of the prong 5 is limited only by the curvature of the mandrel which brings the same into contact with the wall thereof at 14. The length, of course, may be less than this, or may be made greater by suitably shaping the stirrup and prong. Preferably the slot 11 is located with its greatest dimension lying in the plane of the curvature of the mandrel, as a result of which, when the bracket is mounted on a bench as shown, the mandrel will be held in a horizontal position slightly raised above said bench.

The tubes are ordinarily made originally in a machine which ejects the formed or uncured tube of raw rubber, the latter being then cut to predetermined lengths. In order to position one of these lengths on the mandrel the workman inserts into one end of the same the nozzle 16 of an air hose 17 provided with a valve 18. He then starts the opposite end of the tube over the end of the mandrel and turns on the air, which by tending to inflate the tube and by rushing forwardly past the same around all sides of the mandrel, greatly facilitates the application of the rubber thereto. The interior of the mandrel is purposely left free and unobstructed so that the heating medium can have free access thereto during the curing process, and the pad 7 is therefore employed to prevent the passage of air through the mandrel interior during the application of the rubber tube thereto and its removal therefrom which is also assisted by air pressure.

It will be understood that many changes can be made in structural details within the scope of our invention, and all such changes we include within the claims hereto annexed which are limited only by the prior state of the art.

Having thus described our invention, what we claim is:

1. In tire making apparatus, a torus-shaped incompletely circular mandrel, and means for supporting the same from one end and holding it horizontal.

2. In tire making apparatus, a torus-shaped incompletely circular mandrel, and means adapted to be inserted in one end whereby it may be held substantially horizontal.

3. In tire making apparatus an incompletely circular, sheet-metal mandrel, an internal reinforcement in one end thereof, and a bracket adapted to engage said reinforcement whereby said mandrel is supported in working position.

4. In tire making apparatus an incompletely circular, sheet-metal mandrel, a reinforcement carried thereby having a non-circular hole, and a bracket having a non-circular part adapted to enter said hole and hold said mandrel immovably.

5. In tire making apparatus, an incompletely circular, sheet-metal mandrel, having an open interior, and a bracket adapted to engage one end of said mandrel and support the same rigidly in operative position, said bracket having provisions for preventing the passage of fluid through said mandrel while the latter is in place thereon.

6. In tire making apparatus, an incompletely circular, hollow, sheet-metal mandrel having an open passage therethrough, and means for supporting said mandrel from one end and simultaneously closing such passage.

7. In tire making apparatus, an incompletely circular, hollow, sheet-metal mandrel, a plate secured in one end thereof and having an oblong aperture therein, and a bracket having an upright against which the end of the mandrel may abut and also having a prong adapted to enter said aperture.

8. In tire making apparatus, an incompletely circular, sheet-metal mandrel, a rigid plate in said mandrel having an aperture, a stirrup carried by the inner side of said plate registering with said aperture, the end of said stirrup having a small aperture in line with the first aperture, and a bracket having a prong adapted to fit said first aperture and stirrup, said prong having a projection to enter said second aperture.

In testimony whereof, we hereunto affix our signatures.

DON A. CLARK.
CLYDE E. LOWE.